Figure 1:
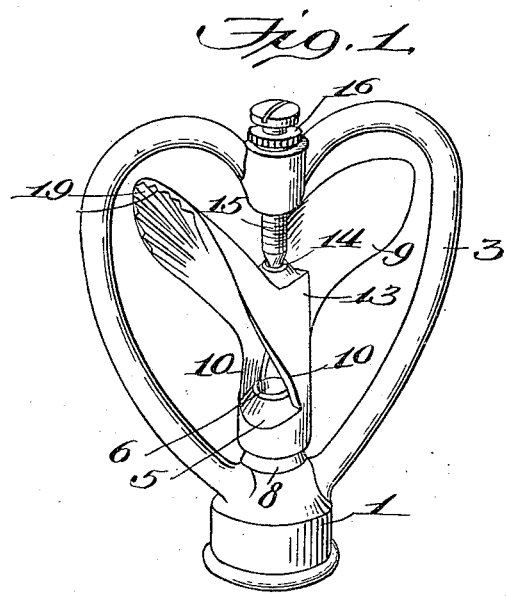

C. H. PERRY.
SPRAYING NOZZLE.
APPLICATION FILED APR. 29, 1909.

961,006.

Patented June 7, 1910.

Witnesses:

Inventor
Charles H. Perry
By
James L. Norris
Atty.

UNITED STATES PATENT OFFICE.

CHARLES H. PERRY, OF MIAMI, FLORIDA, ASSIGNOR OF ONE-HALF TO GEORGE D. ASH, OF LANSING, MICHIGAN.

SPRAYING-NOZZLE.

961,006. Specification of Letters Patent. Patented June 7, 1910.

Application filed April 29, 1909. Serial No. 492,917.

*To all whom it may concern:*

Be it known that I, CHARLES H. PERRY, a citizen of the United States, residing at Miami, in the county of Dade and State of Florida, have invented new and useful Improvements in Spraying-Nozzles, of which the following is a specification.

This invention relates to new and useful improvements in spraying nozzles and has more particular reference to a rotary nozzle for attachment to the end of a stand pipe or hose and especially applicable for use as a lawn sprinkler.

The invention aims as a primary object to provide a nozzle which, *per se*, shall be of novel construction, embodying specifically a pair of oppositely extending wings of peculiar form and relation characterized by the extension of the inner portions of the wings for any desired distance along a radial line and by the extension of the outer portions of the wings at angles to the inner portions and in relatively opposite directions, the wings as an entirety being inclined upwardly and outwardly. The ultimate purpose of this arrangement is to provide for equally dividing the water into two streams which are thrown for a maximum distance over the land, the straight inner portions serving to retain the streams so that they acquire an accelerated centrifugal force and the angularly turned outer portions of the wings serving to efficiently deflect the streams as they discharge from the sprayer. Incidentally the wings may be constructed to break up the streams as they leave the sprayer into a mist or to cause them to leave the sprayer in the form of smaller sub-divided streams, the effect of which is similar to the streams of a rain shower.

A further object of the invention is to provide a sprayer in which the necessary friction in running is reduced to an absolutely minimum degree. This circumstance, coupled with the peculiar formation of the wings, assures of efficient working under very low pressure and, in fact, under pressure much lower than required for the running of rotary spraying nozzles now known to the art. The reduction of the friction to a minimum degree is effected by providing a needle point bearing upon which the sprinkler head runs and in contact with which it is held by the pressure of the water. The point of this bearing is the only point of contact of the nozzle when in use. Consequently, the device may not only operate under an exceedingly low pressure but it has a higher degree of rotary speed, is more satisfactory to maintain and is less expensive to manufacture, since packed joints, special ball bearings, casings, and other devices of expensive nature and unsatisfactory to maintain, are eliminated.

The structure also provides for increasing the initial force of the water as it is delivered to the sprayer by forming the inlet opening thereof, of conical outline in order that the stream as it strikes the vertex of the wings and is divided thereby may be concentrated and so have an acquired force greater than the normal service pressure.

In the accompanying drawings I have illustrated a preferred and advantageous embodiment of the invention.

Figure 2:
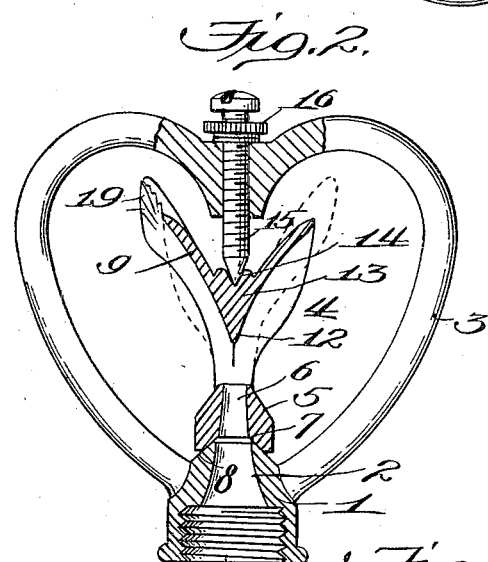
Figure 3:
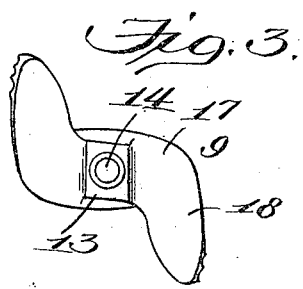
Figure 4:
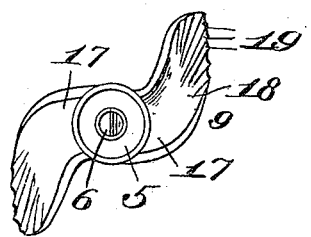
Figure 5:
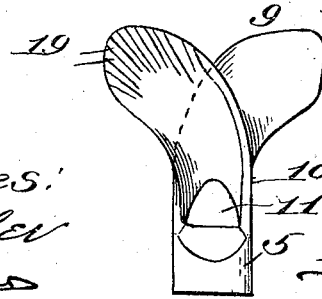

In the said drawings: Figure 1 is a perspective view of a spraying nozzle constructed in accordance with the present invention. Fig. 2 is a central vertical section thereof. Fig. 3 is a top plan view of the wings. Fig. 4 is a bottom plan view thereof. Fig. 5 is a side elevation thereof.

Similar characters of reference refer to corresponding parts throughout the several views.

The base of the nozzle, indicated by the numeral 1, is in the form of an internally threaded collar or cap which may be secured upon a stand pipe or upon the end of a flexible hose or other water conductor and which has a central opening, as 2, through which the water passes, the said opening being preferably of upwardly tapering form. The base 1 may be cast integral with or otherwise rigidly secured to a frame 3 which, for the purpose of a symmetrical appearance, is preferably heart shaped though, from the standpoint of both structure and patentability, no particular shape is necessary. The sprinkler, indicated generally by the numeral 4 and preferably a casting, embodies an annular base, as 5, having a central opening, as 6, which is in alinement with the opening 2 and is preferably upwardly tapered, in order to form with said opening 2, in effect, an uninterrupted cone-shaped discharge way for concentrating the stream before it strikes the vertex of the wings and for imparting thereto an accelerated force. The annular base 5 has a concave under face, as 7, which fits over the convex upper face 8 of the base 1 and, when the device is not in use, rests thereon, but when the device is in use, does not contact therewith except at comparatively distant intervals. The function of the complementary faces 7 and 8 is to assist in centering the sprinkler and to prevent its dislodgement from the frame. These faces, however, are not to be considered as bearing faces for, when the sprinkler is running, the faces 7 and 8 are slightly spaced and are out of contact except for the distant intervals of contact referred to, which will be incident to any irregularity or wabbling of the sprinkler in running, due to slight variations in pressure or other causes.

The wings are indicated by the numeral 9 and are connected to the base 5 by opposite side webs, as 10, shown in Figs. 1 and 3 and between which an opening, as 11, occurs, the said opening 11 being under the vertex 12 of the wings and at the inner terminations of the channels thereof. The wings 9 are preferably of curved cross section and are connected to one another not only by the side webs 10 but also by a common central portion, as 13, upon which the sharp vertex 12 is formed, and which is provided in its upper face with a conical recess, as 14, to receive the pointed end of a screw, as 15, and which for convenience, shall be hereafter referred to as a needle bearing, this being the term generally employed to designate bearings of this nature. The screw 15, as its name implies, is adjustable, and is threaded through an enlargement of the central portion of the frame 3, a lock nut, as 16, being preferably employed to hold the screw against accidental turning, from vibration or other causes. The wings 9 are extended upwardly and outwardly at a comparatively deep angle of inclination and each comprise a straight inner portion, as 17 and an angularly turned outer portion, as 18, the portion 18 of one wing extending in a relatively opposite direction to the portion 18 of the other wing, while, for convenience, the portions 17 are located in coincident radial lines. The cross sectional curvature of the inner portions 17 is greater than the cross sectional curvature of the outer portions 18 and, in fact, the cross sectional curvature of the wings, considered as units, gradually decreases from their inner to their outer ends in order that the stream may be retained in the portions 17, acquiring therein a certain degree of centrifugal force and may be efficiently discharged from the portions 18 which have rounded ends and the channels of which may be plain or smooth finished, as when it is desired to break the stream into a fine mist, or which may be formed with substantially parallel corrugations 19, as shown, as when it is desired to sub-divide the stream into smaller streams and to give the effect of a rain shower. The portions 17, as shown, are of comparatively short length, being only sufficiently long to provide for the necessary slight radial movement of the divided stream, but it is to be understood that where required by circumstances or conditions of working, said portions 17 may be of greater length than shown, if necessary.

In use, a stream of water flows through the openings 2 and 6 and is reduced therein so as to strike the vertex 12 as a concentrated jet. The force of this stream is sufficient to lift the sprinkler 4 against the needle bearing 15 so that the faces 7 and 8 of the bases 1 and 5 are out of contact and so that the sprinkler 4 runs solely on the needle bearing 15 as a center of rotation. The vertex 12 divides the stream into two parts, which flow into the wings 9, the water in the portions 17 thereof furnishing the motive power for causing the rapid rotation of said wings and dropping on the ground comparatively near the spraying nozzle, while the balance of the water, by virtue of its natural force and its acquired centrifugal force, flows along the channels of the wings to the portions 18 and is deflected and evenly distributed thereby for a considerable distance over the land to be irrigated either in the form of a mist, as when the wings have smooth faced channels, or in the form of sub-divided streams resembling rain showers, as when the wings have channels corrugated as shown.

It will thus be seen that the device may be efficiently used at a very low degree of pressure; first, on account of the fact that the sprinkler runs only on the needle point bearing and second, on account of the fact that there is nothing to retard the natural force of the stream but on the contrary the stream is given an acquired force due to its formation in a concentrated jet and also to the peculiar shape of the wings which take advantage of the centrifugal force incident to all sprayers of this general type, that is, involving a rotary sprinkler having oppositely extending wings, but which heretofore, so far as I am aware, have not utilized this centrifugal force in the efficient manner attained by the present invention.

It will also be apparent that the device may be manufactured at a minimum expense since the only baring required is a screw, which is a standard article of manufacture, and since packed joints, special ball bearings, guide and water retaining casings, and other arrangements necessary to prior devices, are eliminated. Aside from the reduction of expense, the elimination of such devices assures of the easy maintenance of the spraying nozzle for practically an interminable period of use, since there are no parts to become out of order or to give trouble, such as those noted in connection with the devices now known in the art.

I have described the sprinkler as having two oppositely extending wings and this, it will be understood, is preferred and from a broad standpoint is known to the art. From the standpoint of patentability, however, the variations noted may be efficiently carried out in a sprayer having one wing of the form shown herein, the one wing sprayers belonging to the "fishtail" type, as it is termed in the trade.

Having fully described my invention, I claim:

1. In a spraying nozzle, in combination, a frame having an upper needle point bearing and a lower cone-faced base, and a sprinkler having an upper recess receiving the end of the bearing and a lower recess conformably fitting over the base, and having water discharging means below the bearing.

2. In a spraying nozzle, in combination, a frame having an upper needle point bearing and a lower cone-faced base having a central opening and a sprinkler having a base conformably fitting over the base of the frame and having also a central opening, said sprinkler having also water discharging means receiving water from the central openings and having a recess above the water discharging means receiving the needle point bearing.

3. In a spraying nozzle, in combination, a frame having an upper needle point bearing and a lower cone-faced base having a central opening and a sprinkler having a base conformably fitting over the base of the frame and having also a central opening, said sprinkler head having also oppositely extending channeled arms receiving water from the openings and provided with a central vertex and having a recess above the wings and receiving the needle point bearing.

4. In a spraying nozzle, in combination, a lower cone-shaped base, a sprinkler, having water discharging means and having also a lower end portion which conformably fits over the base and an upper anti-friction bearing against which the sprinkler is held by the force of the water, the sprinkler being loosely confined between the bearing and the base for rotary movement and limited vertical play.

5. In a spraying nozzle, in combination, a conical centering part, a bearing part, and a sprinkler rotatably held between the centering part and the bearing part, one of the parts being axially adjustable.

6. In a spraying nozzle, a rotary sprinkler provided with an outwardly projecting discharge wing having a radial inner portion and an angularly turned outer portion.

7. In a spraying nozzle, a rotary sprinkler provided with an outwardly projecting and upwardly inclined channeled discharge wing having a radial inner portion and an angularly turned outer portion.

8. In a spraying nozzle, a rotary sprinkler embodying an apertured base, and oppositely extended discharge wings connected to one another by a central vertex portion and to the base by side webs.

9. In a spraying nozzle, in combination, a base having a discharge opening and a conical face surrounding the discharge opening, a frame, a bearing screw threaded through the frame and a rotary sprinkler having a recess to receive the end of the bearing screw and having an apertured base portion to conformably and loosely fit over the conical face of the base.

In testimony whereof I have hereunto set my hand in presence of two subscribing witnesses.

CHARLES H. PERRY.

Witnesses:
A. R. RULE,
H. L. BUSSEY.